(12) United States Patent
Gilman

(10) Patent No.: US 9,454,258 B2
(45) Date of Patent: Sep. 27, 2016

(54) BOOK-LIKE PHYSICAL CONTROL AND FEEDBACK APPARATUS

(71) Applicant: FUJITSU LIMITED, Kawasaki-shi, Kanagawa (JP)

(72) Inventor: Alexander Gilman, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 48 days.

(21) Appl. No.: 14/617,734

(22) Filed: Feb. 9, 2015

(65) Prior Publication Data

US 2016/0231847 A1    Aug. 11, 2016

(51) Int. Cl.
*G06F 3/041* (2006.01)
*G06F 3/0483* (2013.01)

(52) U.S. Cl.
CPC ........... *G06F 3/0416* (2013.01); *G06F 3/0483* (2013.01)

(58) Field of Classification Search
CPC .... G06F 3/038; G06F 3/0416; G06F 3/0483; Y10S 345/901; Y10S 345/902
See application file for complete search history.

(56) References Cited

U.S. PATENT DOCUMENTS

| 5,909,207 A | * | 6/1999 | Ho | G06F 3/002 345/901 |
| 6,229,502 B1 | * | 5/2001 | Schwab | G06F 15/0283 345/901 |
| 8,533,623 B2 | * | 9/2013 | St. Jacques, Jr. | G06F 3/0483 345/901 |
| 8,977,977 B2 | * | 3/2015 | Chong | G06F 3/0483 345/173 |

OTHER PUBLICATIONS

The Reading Brain in the Digital Age: The Science of Paper versus Screens; Ferris Jabr, Scientific American, Apr. 11, 2013, www.scientificamerican.com/article/reading-paper-screens/.

* cited by examiner

*Primary Examiner* — Kevin M Nguyen
(74) *Attorney, Agent, or Firm* — Maschoff Brennan

(57) ABSTRACT

An electronic device is disclosed that includes a pleated user interface having a plurality of ridges and a plurality of valleys; a first sensor coupled with a first ridge of the plurality of ridges; a memory storing a plurality of pages; a display; and a controller coupled with the display, the memory, the sensor, and the pleated user interface. The controller may be configured to provide a first page of the plurality of pages to a user through the display; receive a first signal from the first sensor indicating an interaction with at least the first ridge of the pleated user interface; and provide a second page of the plurality of pages to the display in response to receiving the first signal, wherein the second page is adjacent to the first page.

20 Claims, 16 Drawing Sheets

(End view)

(Side view)

(End view)

(Side view)

(End view)

(Side view)

(End view)

(Top view)

(End view)

(Top view)

BOOK-LIKE PHYSICAL CONTROL AND FEEDBACK APPARATUS

FIELD

This disclosure relates generally to Book-Like Physical Control and Feedback Apparatus.

BACKGROUND

Electronic distribution of information has gained in importance with the proliferation of personal computers and has undergone a tremendous upsurge in popularity as the Internet has become widely available. With the widespread use of the Internet, it has become possible to distribute large, coherent units of information, such as books, using electronic technologies. Books distributed using electronic technologies are commonly referred to as electronic books ("e-books"). Various entities make e-books available for download over ordinary Internet connections, such as broadband and dialup connections.

E-readers ("e-readers") attempt to mimic the experience of reading a conventional paper book through display of electronic information on one or more electronic displays. A typical e-reader is a handheld digital device having a liquid crystal display panel and enough memory and processing capability to store several e-books. Such a device is capable of retrieving and displaying an e-book or portion of an e-book for reading.

There are some advantages to using an e-reader over conventional paper books. An e-reader is often capable of storing a number of complete unabridged e-books. Therefore, an e-book reader containing a number of stored e-books weighs significantly less than the same number of paper books. This makes an e-book reader a particularly attractive alternative to paper books for travel, educational purposes, and professional business use. Also, because e-books do not require the use of paper products, they are generally offered at a lower price than their paper book counterparts. Furthermore, the use of e-readers in conjunction with e-books may be beneficial to the ecosystem, by reducing a number of books produced using paper products.

SUMMARY

An electronic device is disclosed that includes a pleated user interface having a plurality of ridges and a plurality of valleys; a first sensor coupled with a first ridge of the plurality of ridges; a memory storing a plurality of pages; a display; and a controller coupled with the display, the memory, the sensor, and the pleated user interface. The controller may be configured to provide a first page of the plurality of pages to a user through the display; receive a first signal from the first sensor indicating an interaction with at least the first ridge of the pleated user interface; and provide a second page of the plurality of pages to the display in response to receiving the first signal, wherein the second page is adjacent to the first page.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed for a physical feedback apparatus that may be used with electronic components such as, for example, e-readers like the Amazon Kindle reader, the Barnes and Noble NOOK, or the Kobo Glo. Embodiments of the physical feedback apparatus may be incorporated within an e-reader and may provide a tactile under interface that is similar to reading a physical book. Embodiments described herein include physical feedback apparatus that includes a plurality of ridges that may be flicked or riffled by a user to progress pages in, for example, an electronic book. Embodiments described herein include physical feedback apparatus that includes a plurality of ridges that may be refracted and/or extended to change the thickness of the physical feedback apparatus and or indicate the relative location of a portion of, for example, an electronic book.

In some embodiments, a physical feedback apparatus may include a plurality of ridges that may be coupled to actuators that may change the ridges into valleys, thereby altering the physical feedback apparatus's overall thickness. This can be done, for example, by changing the spacing between the ridges and/or by withdrawing a subset of the ridges and converting them into deep valleys. This may decrease the thickness of the physical feedback apparatus and/or reduce the number of ridges that are available for interaction with a user.

In some embodiments, the various ridges may include one or more sensors disposed along the length of the ridges. Moreover, in some embodiments, the various ridges may also include a plurality of indicators or LEDs disposed along the length of the ridges.

Figures 1A, 1B:
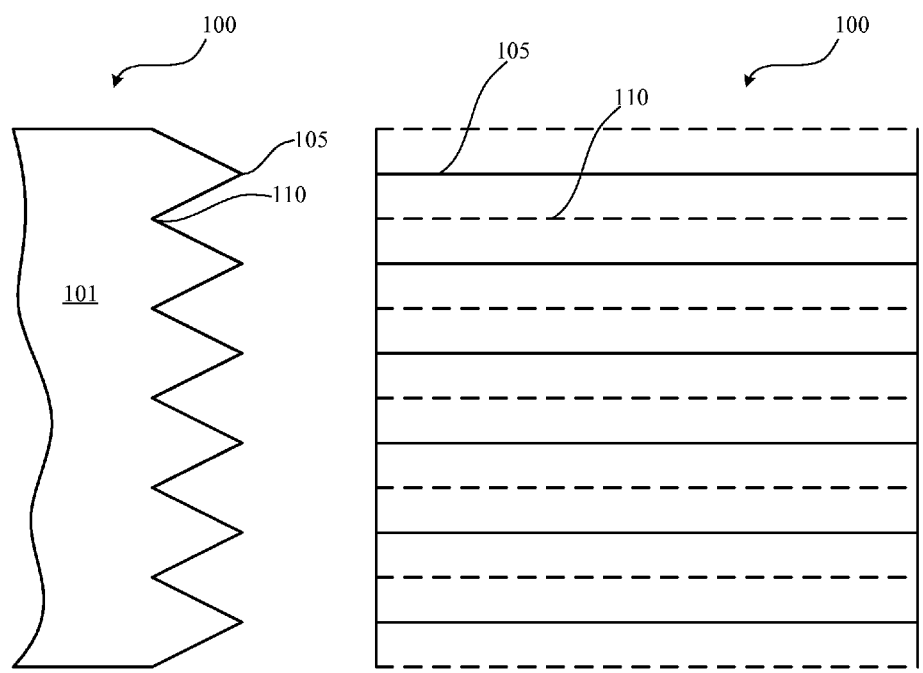
FIG. 1A illustrates an end view of a physical feedback apparatus according to some embodiments described herein.
FIG. 1B illustrates a side view of the physical feedback apparatus shown in FIG. 1A according to some embodiments described herein.
Figure 2:
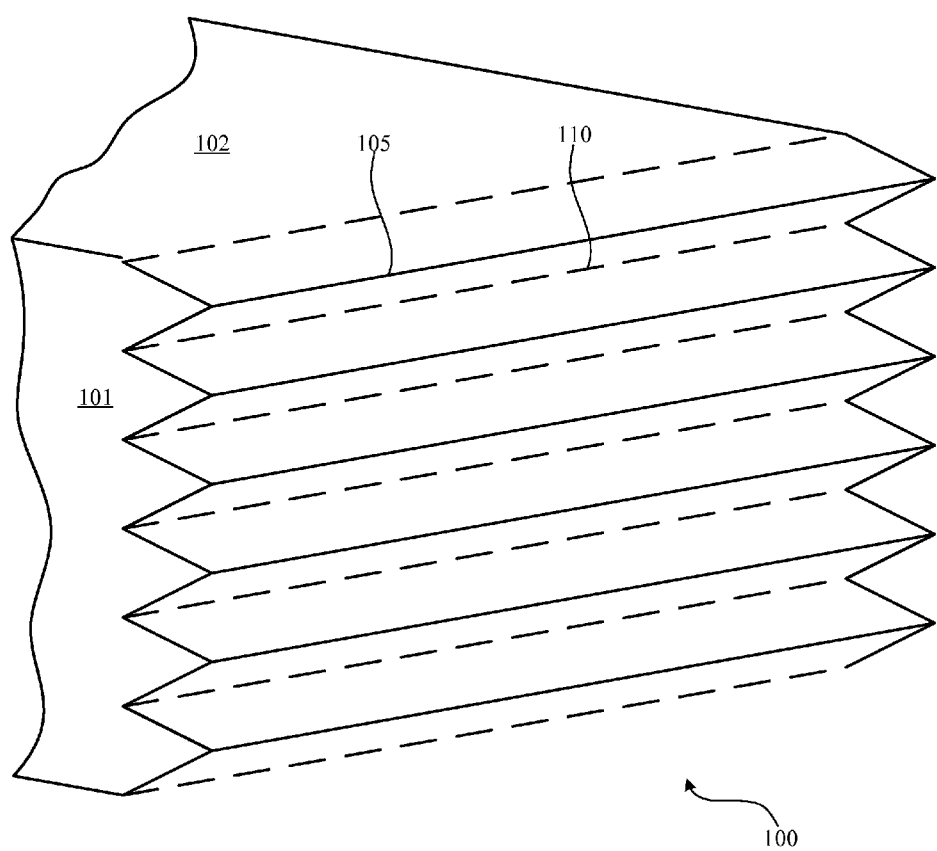
FIG. 2 illustrates a perspective view of the physical feedback apparatus shown in FIG. 1A according to some embodiments described herein.

FIG. 1A illustrates an end view of a physical feedback apparatus 100 according to some embodiments described herein. FIG. 1B illustrates a side view of the physical feedback apparatus 100 shown in FIG. 1A; and FIG. 2 illustrates a perspective view of the physical feedback apparatus 100 shown in FIG. 1A. The physical feedback apparatus 100 includes a sheet of material with a plurality of ridges 105 and a plurality of valleys 110. In FIG. 1B, the valleys 110 are represented by dashed lines. The physical feedback apparatus 100 may be coupled with a device having a top surface 102 and a side surface 101. The device may include an electronic reader (e-reader), a tablet, a phone, or any other electronic device. The device may include an electronic display, for example, that is coupled with the top surface 102 of the device. The physical feedback apparatus 100 may be used as a user interface for the electronic device.

In some embodiments, the distance between the ridges 105 and the valleys 110 may be about 100, 80, 60, 40, 30, 25, 20, 15, 10, 5 mm, etc. In some embodiments, the ridges 105 and/or the valleys 110 may have a width of about 10, 9, 8, 7, 6, 5, 4, 3, 2, 1 mm, etc.

In some embodiments, the physical feedback apparatus 100 may include a sheet of flexible material with variable thicknesses. In some embodiments, the physical feedback apparatus 100 may have a greater thickness between the ridges 105 and the valleys 110 and a thinner thickness at and/or around the ridges and/or the valleys. In some embodiments, the physical feedback apparatus 100 may be formed from a sheet of plastic material. In some embodiments, the physical feedback apparatus 100 may be formed from a sheet of translucent material.

Figure 3A:
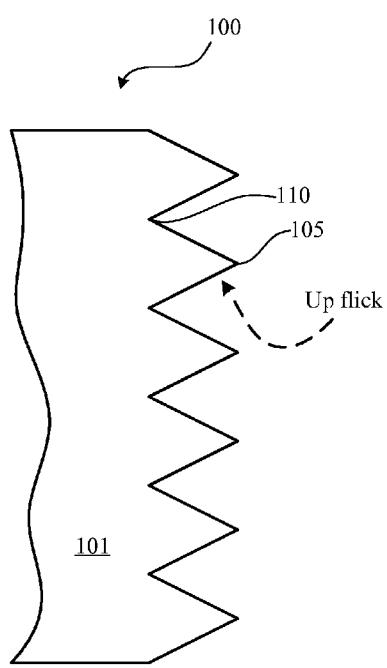
FIG. 3A illustrates an upward flick on the physical feedback apparatus according to some embodiments described herein.
Figure 3B:
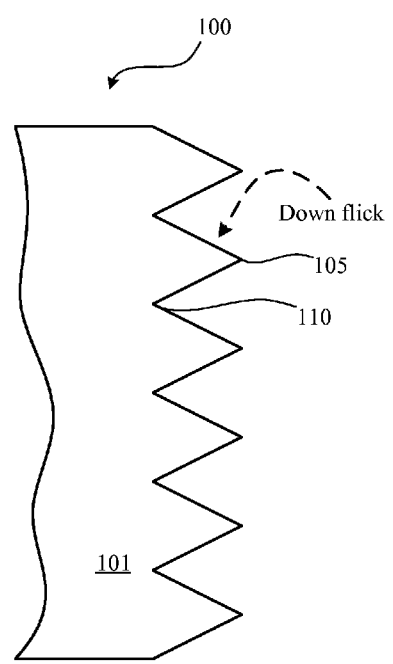
FIG. 3B illustrates a downward flick on the physical feedback apparatus according to some embodiments described herein.

The physical feedback apparatus 100 may be used, for example, to input one or more user gestures and/or modify what is being displayed on the device. As will be described in more detail below, a user may interact with the physical feedback apparatus 100 in a number of ways. For example, FIG. 3A illustrates an upward flick on the ridge 105 of the physical feedback apparatus 100. An upward flick is an action whereby one or more ridges are moved upwardly relative to the top surface 102 of the device with which the physical feedback apparatus 100 is coupled. As another example, FIG. 3B illustrates a downward flick on the physical feedback apparatus 100. A downward flick is an action whereby one or more ridges are moved downwardly relative to the top surface 102 of the device with which the physical feedback apparatus 100 is coupled.

A user, for example, may brush a finger or a thumb upwardly against one or more ridges to perform an upward flick gesture. As another example, the user may brush a finger or thumb downwardly against one or more ridges to perform a downward flick gesture. The upward flick gesture and/or the downward flick gesture may be translated to an electrical signal by one or more sensors and used, for example, to manipulate or change what is being displayed to a user on a display of an e-reader or for any other purpose.

In some embodiments, a flick gesture may include the upward or downward action on a single ridge. A riffle may include the upward or downward action on more than one ridge. Moreover, in some embodiments, the translated electrical signals may differ between a riffle and a flick. Furthermore, in some embodiments, the translated electrical signals may differ between an upward and a downward flick and/or between an upward and a downward riffle.

Figures 6A, 6B:
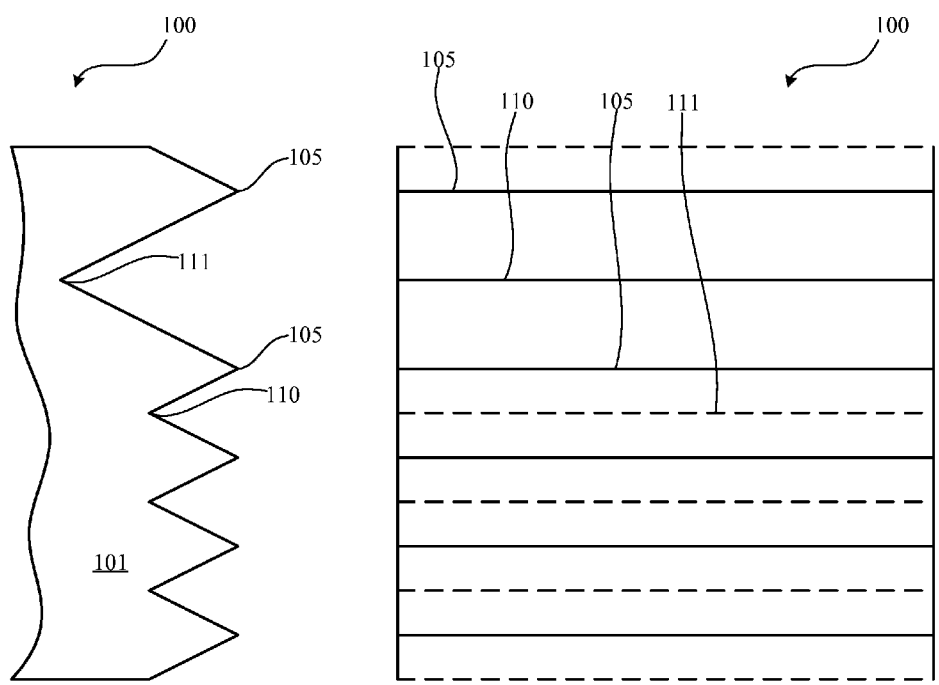
FIG. 6A illustrates an end view of a physical feedback apparatus according to some embodiments described herein.
FIG. 6B illustrates a side view of the physical feedback apparatus shown in FIG. 6A according to some embodiments described herein.
Figure 7:
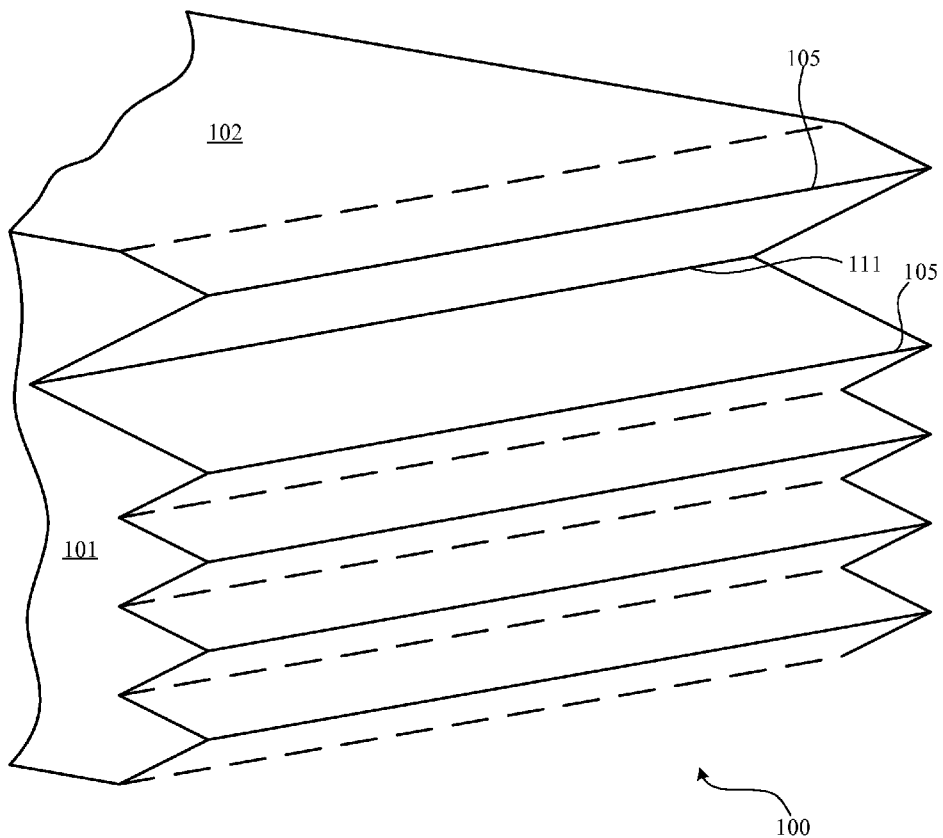
FIG. 7 illustrates a perspective view of the physical feedback apparatus shown in FIG. 6A according to some embodiments described herein.

As another example, the user may press the ridge 105 or a portion of the ridge 105 such as the top edge or a bottom edge or a ridge inwardly to create a deep valley as shown in more detail in FIG. 6A, FIG. 6B, and FIG. 7.

Figures 4A, 4B:
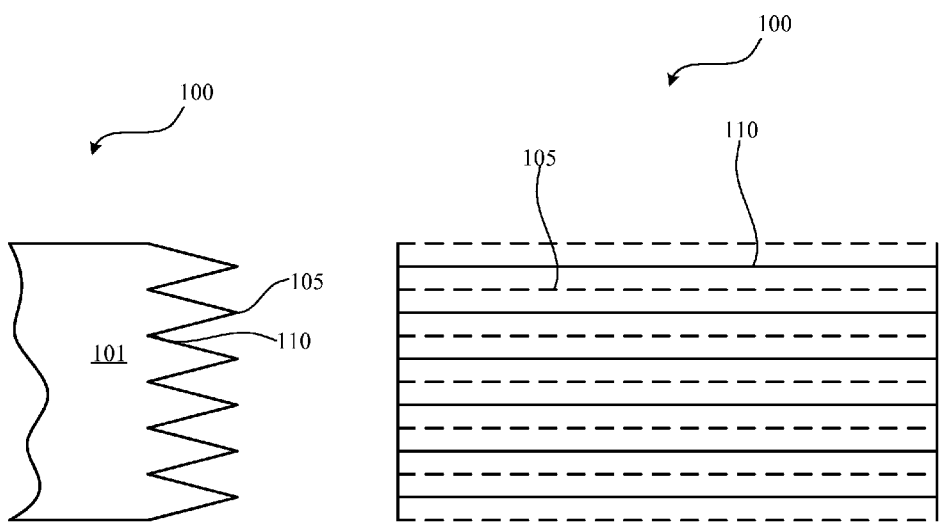
FIG. 4A illustrates an end view of a physical feedback apparatus according to some embodiments described herein.
FIG. 4B illustrates a side view of the physical feedback apparatus shown in FIG. 4A according to some embodiments described herein.
Figure 5:
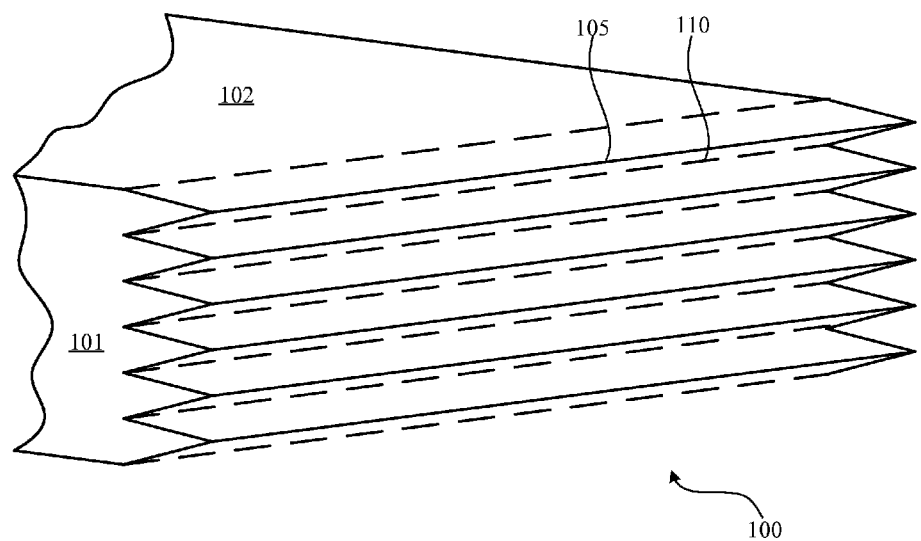
FIG. 5 illustrates a perspective view of the physical feedback apparatus shown in FIG. 4A according to some embodiments described herein.

FIG. 4A illustrates an end view of the physical feedback apparatus 100 that has been compressed according to some embodiments described herein. FIG. 4B illustrates a side view of the compressed physical feedback apparatus 100 shown in FIG. 4A. FIG. 5 illustrates a perspective view of the compressed physical feedback apparatus 100 shown in FIG. 4A. As shown in these figures, the physical feedback apparatus 100 may be expanded and/or compressed in an accordion-like manner.

In some embodiments, one or more of the ridges 105 may be translated into the valley 110. FIG. 6A illustrates an end view of the physical feedback apparatus 100 with a ridge translated into a deep valley 111 according to some embodiments described herein. FIG. 6B illustrates a side view of the physical feedback apparatus shown in FIG. 6A. And FIG. 7 illustrates a perspective view of the physical feedback apparatus 100 shown in FIG. 6A. In this embodiment, the new, deeper valley 111 has been formed in the physical feedback apparatus 100. This can be accomplished in any number of ways. The ridge 105 may be translated into a deeper valley with an actuator, a stepper motor and wheel, and/or by user interaction. In some embodiments, only a portion of a ridge may be translated into a deeper valley.

Figure 8A:
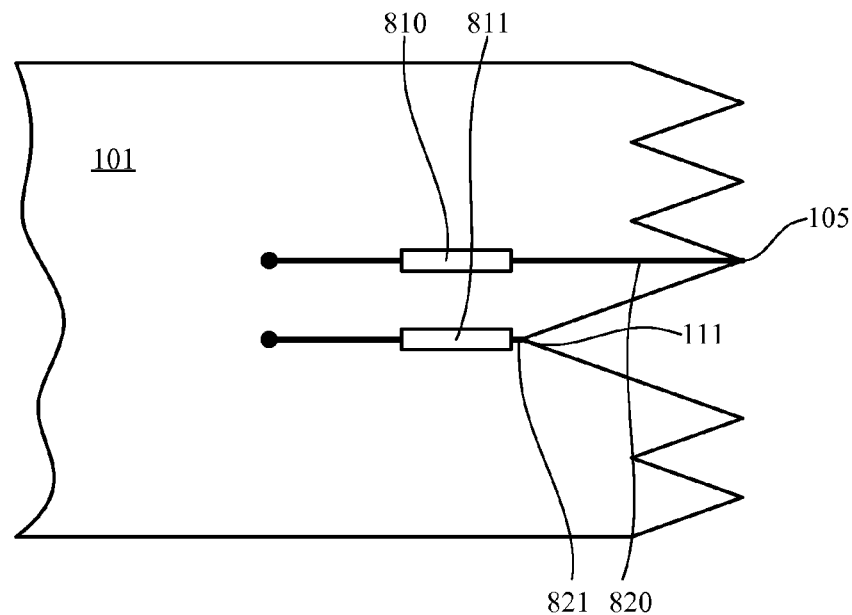
FIGS. 8A and 8B illustrate an end view and a top view of a physical feedback apparatus with actuators according to some embodiments described herein.

In some embodiments, the ridge 105 may be translated into the deeper valley 111 using an actuator and/or a stepper motor. FIG. 8A illustrates an end view of an example of the physical feedback apparatus 100 with actuators 810 & 811 and struts 820 & 821 according to some embodiments described herein. In this embodiment, the actuator 810 is coupled with the strut 820, which is coupled with the ridge 105. The strut 820, for example, may be coupled with a rigid bar that extends the length of the ridge 105. The actuator 810 is fully extended in this position. In this example, the actuator 811 is coupled with the strut 821, which is coupled with the deep valley 111. The actuator 811 is fully retracted in this position. Thus, the actuator 810 and the actuator 811 can actuate to change a ridge into a deep valley and vice versa.

In some embodiments, the actuator may actuate a distance that is at least twice the distance between a ridge and a valley. For example, if the distance between a ridge and a valley is 10 mm, then the actuator may actuate a distance of 20 cm.

The strut 820 and/or strut 821, for example, may be made of metal, plastic, and/or composite materials.

In some embodiments, each ridge 105 of the physical feedback apparatus 100 may be coupled with a strut and/or an actuator. In some embodiments, a subset of the ridges 105 may be coupled with a strut and/or an actuator. In some embodiments, the actuator may be a linear actuator, a mechanical actuator, a piezoelectric linear actuator, or some combination thereof.

In some embodiments, the strut may include a strut sensor. The strut sensor may comprise a bend sensor, a flex sensor, a pressure sensor, a compression sensor, and/or an accelerometer, etc. The strut sensor may provide an electrical signal corresponding to an interaction with the ridge 105. The strut sensor may sense lateral and/or linear translation of the ridge 105. The strut sensor may be positioned along the length of the strut 820 or strut 821, at or near the ridge 105, and/or at or near the actuator 810 or actuator 811.

Figure 8B:
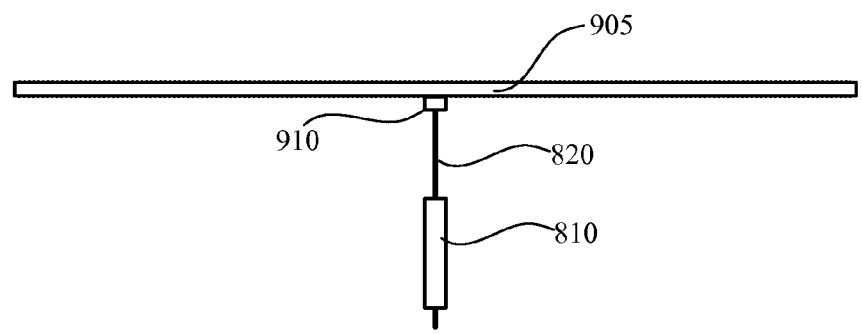

FIG. 8B illustrates a top view of the physical feedback apparatus 100 with actuators 810 & 811 and struts 820 & 821 according to some embodiments described herein. The actuators 810 & 811 may be used, for example, to push and/or pull the ridges in order to compress or expand the physical feedback apparatus 100.

Figure 9A:
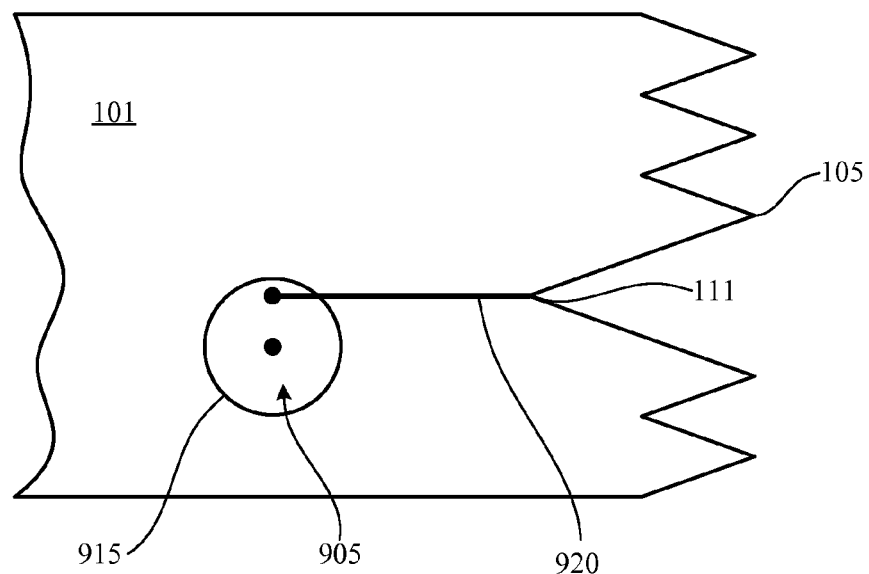
FIGS. 9A and 9B illustrate an end view and a top view of a physical feedback apparatus with a stepper motor according to some embodiments described herein.

FIG. 9A illustrates an end view of an example of the physical feedback apparatus 100 with a stepper motor 905, a wheel 915, and/or a strut 920 according to some embodiments described herein. In some embodiments, more than one stepper motor 905, wheel 915, strut 920, or some combination thereof.

In this embodiment, the stepper motor 905 may be coupled with wheel 915. The stepper motor 905 may be configured to rotate the wheel 915 and move the strut 920, which is coupled with the ridge 105. By rotating the wheel 915, the ridge 105 may be moved inwardly and outwardly. The strut 920, for example, may be coupled with a rigid bar that extends the length of the ridge 105. The other ridges and/or valleys may be coupled with the wheel 915 or with other wheels.

The strut 920, for example, may be made of metal, plastic, and/or composite materials.

In some embodiments, each ridge 105 of the physical feedback apparatus 100 may be coupled with a strut 920. In some embodiments, a subset of the ridges 105 may be coupled with a strut, a stepper motor, wheel, or some combination thereof.

In some embodiments, the strut may include a strut sensor. The strut sensor may comprise a bend sensor, a flex sensor, a pressure sensor, a compression sensor, and/or an accelerometer, etc. The strut sensor may provide an electrical signal corresponding to an interaction with the ridge 105. The strut sensor may sense lateral and/or linear translation of the ridge 105. The strut sensor may be positioned along the length of the strut 920 at or near the ridge 105.

Figure 9B:
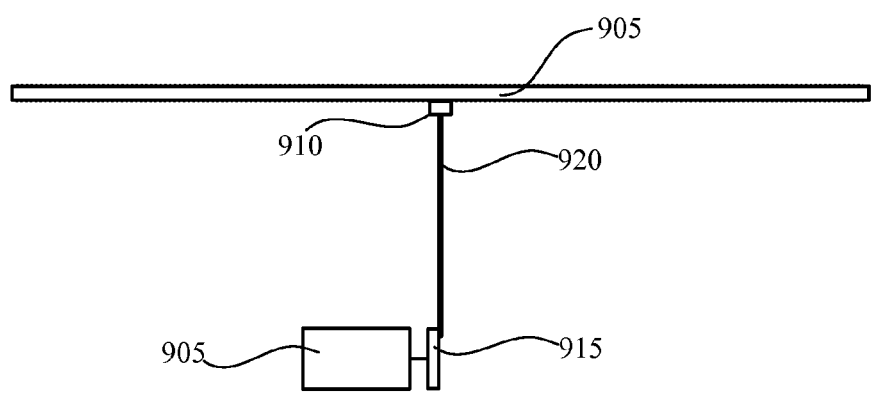

FIG. 9B illustrates a top view of the physical feedback apparatus 100 with stepper motor 905, wheel 915, strut 920, or some combination thereof according to some embodiments described herein. The stepper motor 905, wheel 915, strut 920, or some combination thereof may be used, for example, to push and/or pull the ridges in order to compress or expand the physical feedback apparatus 100.

Figure 10:
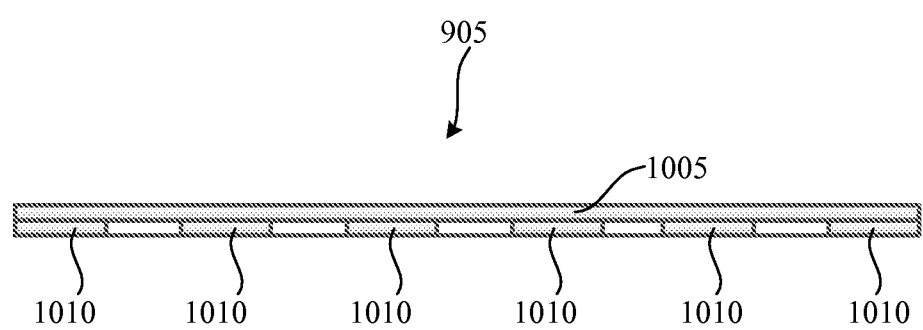
FIG. 10 illustrates sensors and indicators that may be coupled with a ridge of a physical feedback apparatus according to some embodiments described herein.

The indicator array 905 may extend along the length of each ridge 105 of the physical feedback apparatus 100. An example configuration of the indicator array 905 is illustrated in FIG. 10. The indicator array 905 may include an indicator array 1005. The indicator array 905 may include, for example, one or more LEDs distributed along the length of the indicator array 905 that produce light with the same or different color of light. The various LEDs, for example, may be illuminated at different times in response to different user interactions with the physical feedback apparatus 100 or other user inputs.

The indicator array 905 may also include one or more bend sensors 1010. In the example shown in FIG. 10, a plurality of bend sensors 1010 are distributed along the length of the indicator array 905. The bend sensors 1010 may be used to sense a flick of a ridge or any other interaction with a user. In response, a signal may be sent to a controller that performs some action based on the user's interaction with the ridge.

The indicator array 905 may have a longitudinal length that is the same as the length of a ridge or valley of the physical feedback apparatus 100. The indicator array 905 may, for example, also have a width of about 10, 9, 8, 7, 6, 5, 4, 3, 2, or 1 mm, etc.

Figure 11:
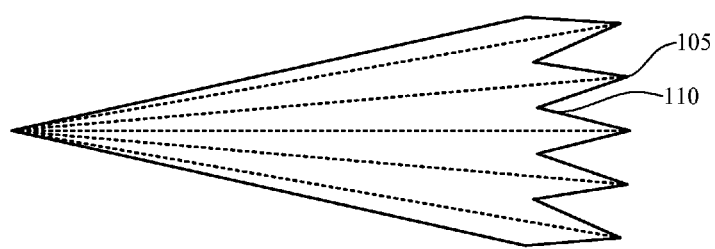
FIG. 11 illustrates an end view of a physical feedback apparatus according to some embodiments described herein.
Figure 12:
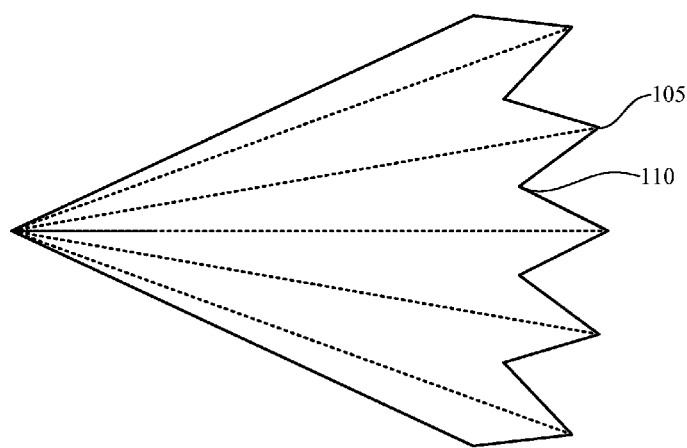
FIG. 12 illustrates an end view of a physical feedback apparatus according to some embodiments described herein.

FIG. 11 illustrates an end view of the physical feedback apparatus 100 in a compressed state according to some embodiments described herein. FIG. 12 illustrates an end view of the physical feedback apparatus 100 in an expanded state according to some embodiments described herein. In the embodiments shown in FIG. 11 and FIG. 12 the physical feedback apparatus 100 may transition between the compressed state and the expanded state by engaging the stepper motor 805 and pressing each and every ridge that is coupled with the stepper motor either inwardly or outwardly. The physical feedback apparatus 100 may expand by pulling the ridges inwardly and may be compressed by pushing the ridges outwardly.

In some embodiments, the stepper motor 805 and the wheel 815 may be removed and the actuator 810 and/or actuator 811 may be used to push and pull the ridges simultaneously in the horizontal plane to expand and contract the physical feedback apparatus 100 in the vertical plane (or an orthogonal plane).

In the embodiments shown in FIG. 11 and FIG. 12 the physical feedback apparatus 100 may include struts, actuators, and/or sensors coupled with the various ridges of the physical feedback apparatus 100. Moreover, the struts may be positioned on or near the dashed line coupled with each ridge. Furthermore, the struts may be arranged to couple or meet at a central location and/or at a wheel coupled with a stepper motor as described above.

Figure 13:
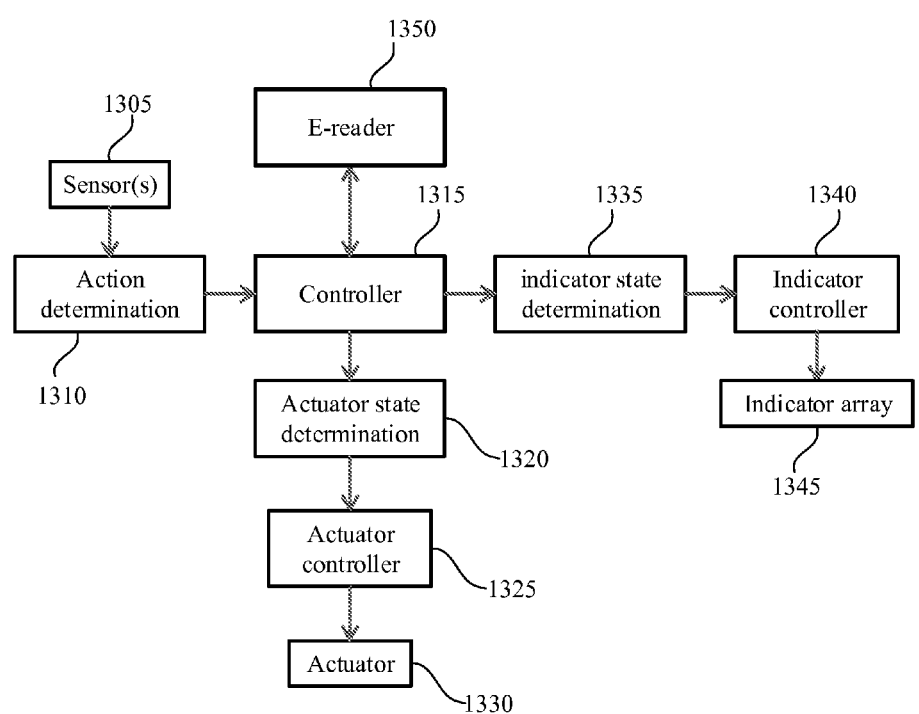
FIG. 13 is a block diagram of various components of a physical feedback apparatus according to some embodiments described herein.

FIG. 13 is a block diagram of electrical and/or control components of the physical feedback apparatus 100 according to some embodiments described herein. A controller 1315 may receive data and/or send control signals. The controller 1315 may include any type of microprocessor, controller, processor, etc. The controller 1315 may be part of a controller associated with an e-reader 1350. The controller 1315 may include all or part of a computational system 1600.

Data may be collected from one or more sensors 1305. These sensors may include, for example, a bend sensor, a flex sensor, a pressure sensor, a compression sensor, and/or an accelerometer, etc. The sensors may include the strut sensor 910, the bend sensors 1010, etc. In some embodiments, an analog-to-digital converter may convert analog data from the sensors 1305 into digital data.

The sensor data may be received at an action determination block where it can be determined whether a user action has occurred. The action determination may include determining whether a given gesture has occurred by the user such as, for example, an upward flick, a downward flick, an upward riffle, a downward riffle, a bend in a ridge, a bend in a portion of a ridge, etc.

An action determination block 1310 may send a signal, message, packet, etc. to the controller 1315 indicating that a given gesture has occurred. The controller 1315 may send a signal, message, packet, etc. to the e-reader 1350 in response to receiving an indication that a gesture has occurred. The controller 1315 may also send a signal, message, packet, etc. to actuate the actuator 810 or 811; the controller 1315 may also send a signal, message, packet, etc. to the indicator array 905 to provide a given signal via one or more LEDs.

For example, if the user performs an upward riffle through the various ridges 105 of the physical feedback apparatus 100, one or more of the bend sensors 1010 and/or one or more of the strut sensors 910 may provide a signal to the action determination block 1310. The action determination block 1310 may determine that the sensor data indicate an upward riffle of the ridges. The action determination block 1310 may then send a signal, message, packet, etc. to the controller 1315 that an upward riffle has occurred. The controller 1315 may send a signal to the e-reader 1350 that an upward riffle gesture has been performed by the user. In some embodiments, the e-reader 1350 may then display a non-sequential page.

If the controller determines that an actuator 1330 (or the actuator 810 or the actuator 811) should be actuated, then at block 1320, the state of the actuator may be determined. For example, it can be determined whether the actuator is fully or partially extended, or fully or partially retracted. Based on a signal, message, packet, etc. from the controller 1315 and/or the state of the actuator 1330, an actuator controller 1325 may provide a signal to the actuator 1330 to actuate.

If the controller determines that an indicator array 1345 (or the indicator array 905) should change whether one or more LEDs should be illuminated, then at block 1335, the state of the indicator array 1345 may be determined. For example, it can be determined which of the various LEDs of the indicator array 1345 is illuminated. Based on a signal, message, packet, etc. form the controller 1315 and/or the state of the indicator array 1345, an indicator controller 1340 may provide a signal to the indicator array 1345 to change the state of one or more LEDs.

Figure 14:
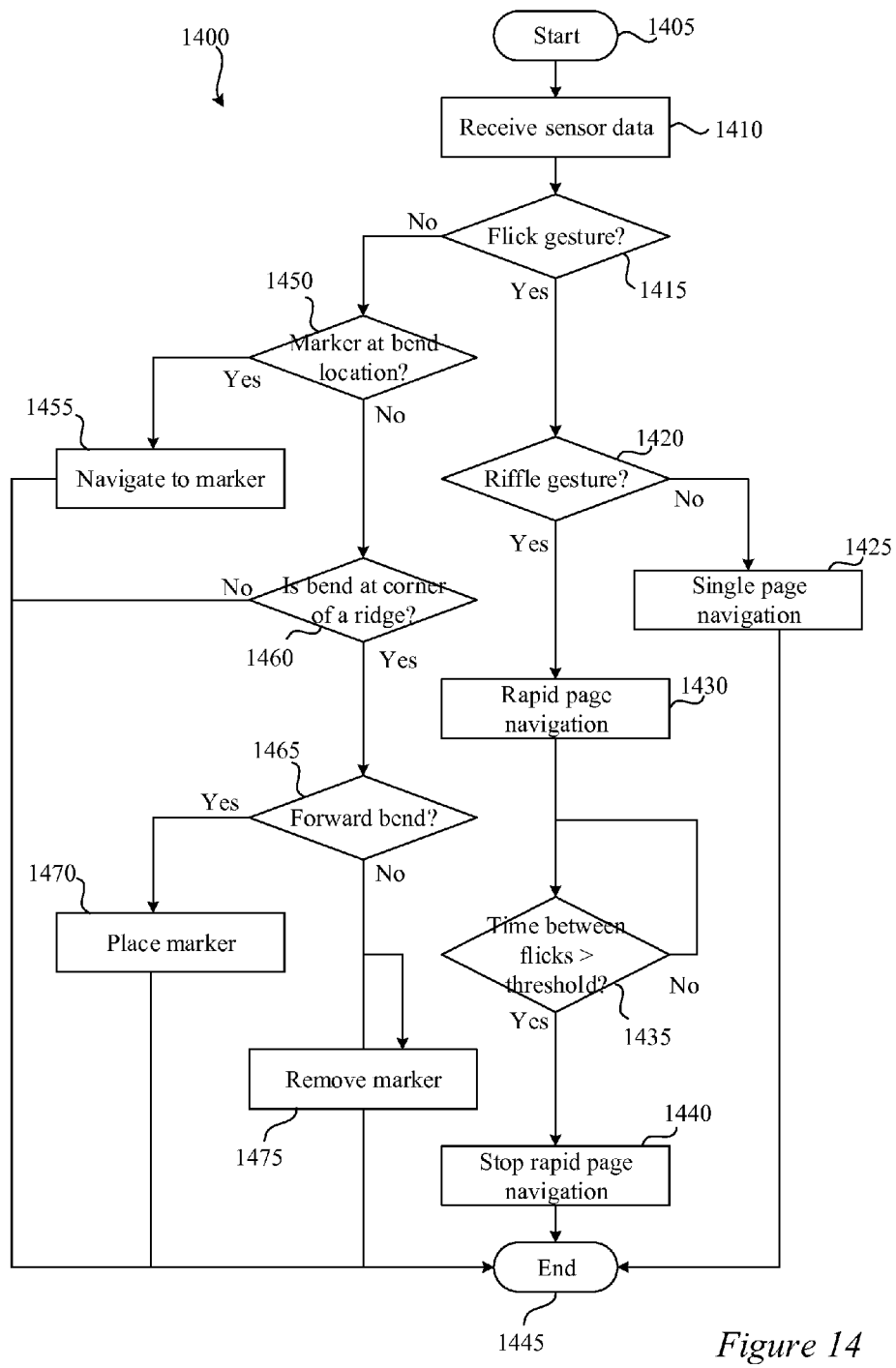
FIG. 14 illustrates an example flowchart of a process for navigating pages using a physical feedback apparatus according to some embodiments described herein.

FIG. 14 illustrates an example flowchart of a process 1400 for navigating pages of an e-reader using a physical feedback apparatus according to some embodiments described herein. One or more steps of the process 1400 may be implemented, in some embodiments, by one or more components of the computational system 1600 of FIG. 16 and/or the controller 1315 of FIG. 13. Although illustrated as discrete blocks, various blocks may be divided into additional blocks, combined into fewer blocks, or eliminated, depending on the desired implementation.

The process 1400 begins at block 1405. At block 1410 sensor data may be received. The sensor data may include data from, for example, one or more strut sensors 910 and/or one or more bend sensors 1010. Any other sensor data may also be received. The sensor data, for example, may be received through one or more analog-to-digital converters and/or through the action determination block 1310. The sensor data may include data associated with a specific ridge or a series of ridges. For example, the sensor data may include data from a strut sensor coupled with a specific ridge and data from a bend sensor coupled with the specific ridge.

At block 1415 it can be determined whether the sensor data received at block 1410 is consistent with a flick gesture such as an upward flick gesture or a downward flick gesture. The determination of whether the sensor data is consistent with a flick gesture may be based at least in part on calibration data for a specific implementation, a specific device, or specific line of devices. The sensor data may indicate, for example, that the specific ridge was interacted with by a user in a manner consistent with a flick gesture.

If the sensor data is consistent with a flick gesture, then the process 1400 proceeds to block 1420. At block 1420 it can be determined whether the sensor data is consistent with a riffle gesture. This can be determined, for example, if the sensor data is consistent with a flick gesture occurring at other ridges near the specific ridge.

If the sensor data is not consistent with a riffle gesture, then the process 1400 proceeds to block 1425 where the e-reader may navigate to the next page in a digital media being displayed to a user. The process 1400 may then end at block 1445.

If the sensor data is consistent with a riffle gesture, then the process 1400 proceeds to block 1430 where the e-reader may navigate to a future page in the digital media being displayed to a user. The process 1400 may proceed to block 1435 where it can be determined if the time between flick gestures of the same ridges or neighboring ridges is greater than a threshold value. If it is, then the process 1400 proceeds to block 1420 where the rapid pagination ends and the process 1400 may then end at block 1445. If the time between flick gestures is less than the threshold value, then the process 1400 remains at block 1435 until the time between the flick gestures is greater than the threshold value.

Returning to block 1415, if the sensor data is not consistent with a flick gesture, then the process 1400 proceeds to block 1450. At block 1450 it can be determined whether the given indicator array 905 on the specific ridge associated with the sensor data has an illuminated LED. If an LED at the indicator array 905 is illuminated, then the process 1400 proceeds to block 1455 and the e-reader navigates to a page associated with the indicator array having the illuminated LED. A specific page in the plurality of pages that make up the e-reader media may have been previously associated with the specific ridge, and this association may be stored in memory such as, for example, in a lookup table. By noting the specific ridge, the page number can be returned from memory. In this way, for example, a user may navigate to a future page that has been saved with an illuminated indicator array. Following block 1455, the process 1400 may end at block 1445.

If, however, an LED on the indicator array 905 is not illuminated on the specific ridge, then the process 1400 proceeds to block 1460. At block 1460 it can be determined whether the sensor data is consistent with a corner of a ridge being bent or pushed inwardly and the process 1400 proceeds to block 1465. This may be determined based on the location of a sensor on the indicator array 905 and/or the amplitude of the sensor signal. The sensor data, for example, may include data from indicating that a bend sensor near the top or bottom of the indicator array has been pressed inwardly. If, however, the sensor data is not consistent with a corner of a ridge being bent or pushed inwardly, then the process 1400 ends at block 1445.

At block 1465 it can be determined whether the sensor data is consistent with an upward (or forward) bend of the specific ridge. If it is, then the process 1400 proceeds to block 1470 where an LED on the indicator array at or near the ridge receiving the sensor data may be illuminated at block 1470. Alternatively, if the sensor data is not associated with an upward bend, then the process 1400 proceeds to block 1475 and a previous marker may be removed such as, for example, by turning off an LED. Then the process 1400 may end at block 1445.

Figure 15A:
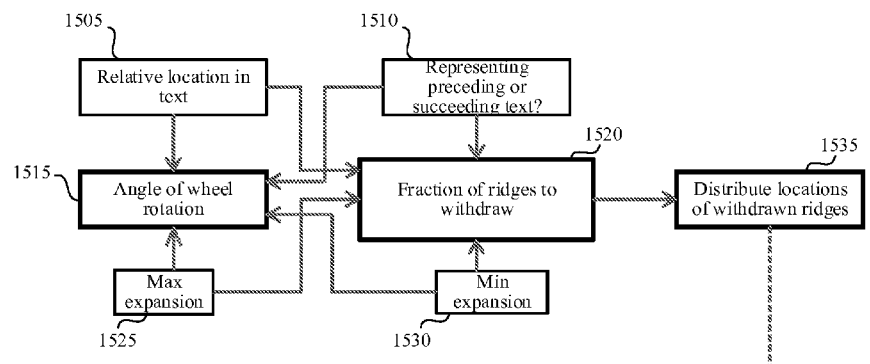
FIG. 15A illustrates an example flowchart of a process for retracting (or withdrawing) ridges according to some embodiments described herein.

FIG. 15A illustrates an example flowchart of a process for retracting (or withdrawing) ridges according to some embodiments described herein. This may depend on the angle of rotation of the wheel 815 as noted in block 1515 and/or the fraction of ridges that should be withdrawn as noted in block 1520. Both of these values may be determined based on relative location of the electronic book within text 1505, whether proceeding or succeeding text should be withdrawn 1510, the maximum expansion of the physical feedback apparatus 1525, and/or the minimum expansion of the physical feedback apparatus 1530. Once the values in block 1515 and block 1520 are determined, the various ridges may be withdrawn at block 1535.

Figure 15B:
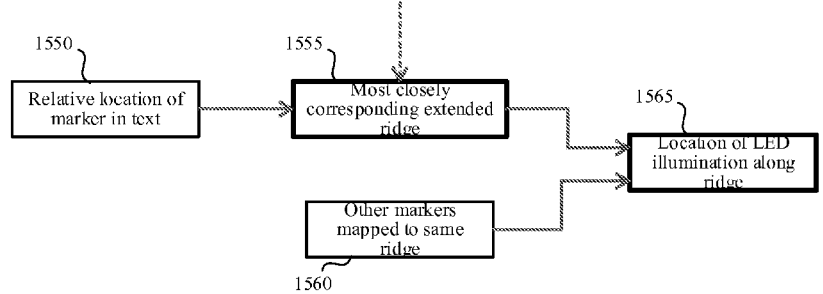
FIG. 15B illustrates an example flowchart of a process of determining which of a plurality of indicator lights should be illuminated according to some embodiments described herein.

FIG. 15B illustrates an example flowchart of a process of determining which of a plurality of indicator lights should be illuminated according to some embodiments described herein. As shown in FIG. 10, the indicator array 905 may include a plurality of LEDs arranged along the length of the indicator array 905. The indicator array 905 may be disposed along a ridge. The location of the LED light that should be illuminated 1565 may depend on the most closely corresponding extended ridge 1555, which may depend on the relative location of the marker in the text of the electronic device 1550, and/or an indication of the various ridges that are extended or withdrawn 1535. The location of the LED light that should be illuminated 1565 may also depend on whether other markers are mapped to the same ridge and/or indicator array 1560.

Figure 16:
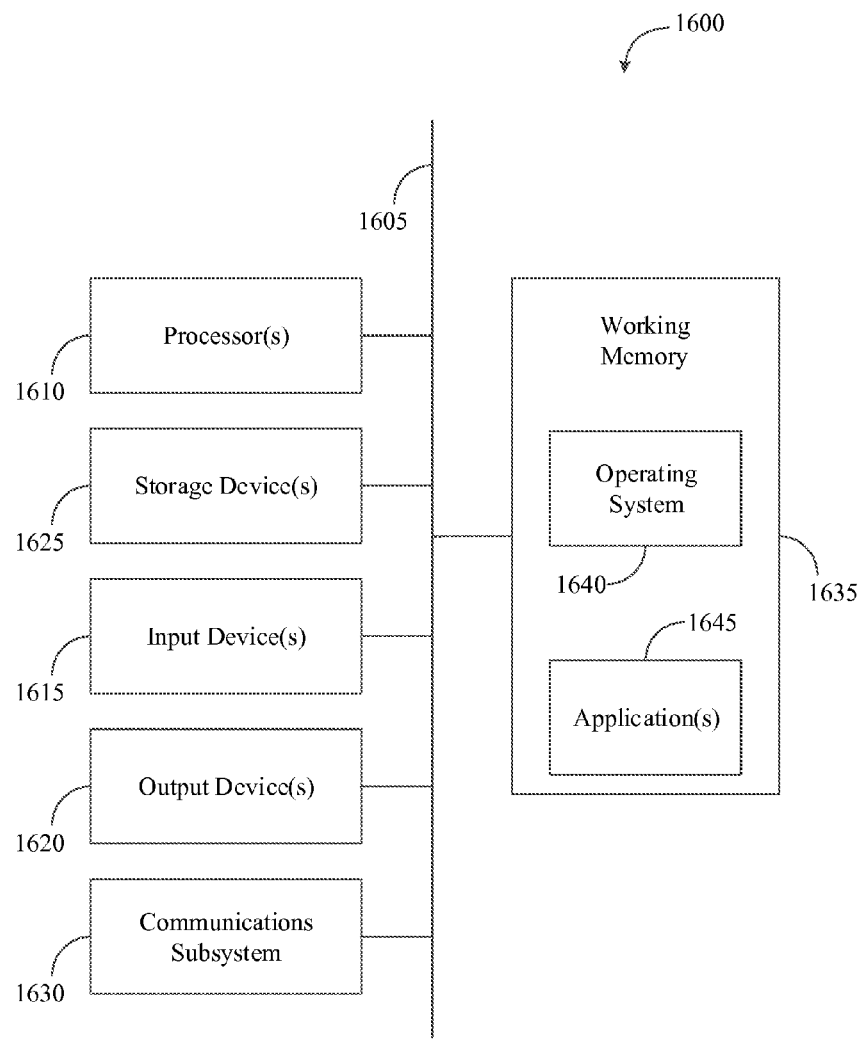
FIG. 16 shows an illustrative computational system for performing functionality to facilitate implementation of embodiments described herein.

The computational system 1600 (or processing unit) illustrated in FIG. 16 can be used to perform any of the embodiments of the invention. For example, the computational system 1600 may be part of an e-reader device or the controller 1315. The computational system 1600 may calculate any calculation or make any determination described herein.

For example, the computational system 1600 can be used alone or in conjunction with other components. As another example, the computational system 1600 can be used to perform any calculation, solve any equation, perform any identification, and/or make any determination described herein. The computational system 1600 includes hardware elements that can be electrically coupled via a bus 1605 (or may otherwise be in communication, as appropriate). The hardware elements can include one or more processors 1610, including, without limitation, one or more general-purpose processors and/or one or more special-purpose processors (such as digital signal processing chips, graphics acceleration chips, and/or the like); one or more input devices 1615, which can include, without limitation, a mouse, a keyboard, and/or the like; and one or more output devices 1620, which can include, without limitation, a display device, a printer, and/or the like.

The computational system 1600 may further include (and/or be in communication with) one or more storage devices 1625, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, and/or the like. The computational system 1600 might also include a communications subsystem 1630, which can include, without limitation, a modem, a network card (wireless or wired), an infrared communication device, a wireless communication device, and/or chipset (such as a Bluetooth® device, a 802.6 device, a Wi-Fi device, a WiMAX device, cellular communication facilities, etc.), and/or the like. The communications subsystem 1630 may permit data to be exchanged with a network (such as the network described below, to name one example) and/or any other devices described herein. In many embodiments, the computational system 1600 will further include a working memory 1635, which can include a RAM or ROM device, as described above.

The computational system 1600 also can include software elements, shown as being currently located within the working memory 1635, including an operating system 1640 and/or other code, such as one or more application programs 1645, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1625 described above.

In some cases, the storage medium might be incorporated within the computational system 1600 or in communication with the computational system 1600. In other embodiments, the storage medium might be separate from the computational system 1600 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 1600 and/or might take the form of source and/or installable code, which, upon compilation and/or installation on the computational system 1600 (e.g., using any of a variety of generally available compilers, installation programs, compression/decompression utilities, etc.), then takes the form of executable code.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

That which is claimed:

1. An electronic device comprising:
   a pleated user interface having a plurality of ridges and a plurality of valleys;
   a first sensor coupled with a first ridge of the plurality of ridges;
   a memory storing a plurality of pages;
   a display; and
   a controller coupled with the display, the memory, the sensor, and the pleated user interface, the controller is configured to:
      provide a first page of the plurality of pages to a user through the display;
      receive a first signal from the first sensor indicating an interaction with at least the first ridge of the pleated user interface; and
      provide a second page of the plurality of pages to the display in response to receiving the first signal, wherein the second page is adjacent to the first page.

2. The electronic device according to claim 1, wherein the first sensor comprises a bend sensor and/or an accelerometer.

3. The electronic device according to claim 1, further comprising a third sensor coupled with a first valley of the plurality of valleys, wherein the second page is provided to the display in response to receiving the first signal and a third signal from the third sensor.

4. The electronic device according to claim 1, wherein the first signal is an up-flick signal.

5. The electronic device according to claim 4, wherein the second page is a page of the plurality of pages subsequent to the first page.

6. The electronic device according to claim 1, wherein the first signal is a down-flick signal.

7. The electronic device according to claim 6, wherein the second page is a page of the plurality of pages prior to the first page.

8. The electronic device according to claim 1, further comprising a plurality of LEDs, wherein at least a subset of the plurality of LEDs is coupled with the first ridge.

9. The electronic device according to claim 1, further comprising:
   an actuator; and
   a strut coupled with the actuator and at least one of the plurality of ridges and/or the plurality of valleys.

10. The electronic device according to claim 1, further comprising:
    a stepper motor;
    a wheel coupled with the stepper motor; and
    a strut coupled with the wheel and at least one of the plurality of ridges and/or the plurality of valleys.

11. The electronic device according to claim 1, wherein the pleated user interface comprises a sheet of material having variable thickness, wherein the sheet is thinner at or near each of the ridges of the plurality of ridges and/or thinner at or near each of the valleys of the plurality of valleys.

12. The electronic device according to claim 1, further comprising a second sensor coupled with a second ridge of the plurality of ridges, wherein the controller is configured to:
    receive a third signal from the first sensor indicating an interaction with at least the first ridge;
    receive a fourth signal from the second sensor indicating an interaction with at least the second ridge; and
    provide a third page of the plurality of pages to the display in response to receiving the third signal and the fourth signal, wherein the third page is not a page that is adjacent to either the first page or the second page.

13. An electronic device comprising:
    a pleated user interface having a plurality of ridges and a plurality of valleys;
    an actuator coupled with a first ridge of the plurality of ridges;
    a display; and a controller coupled with the display and the actuator, the controller being configured to:
provide a first page of a plurality of pages to the display; and
send a signal to the actuator to retract the first ridge of the plurality of ridges so that the first ridge becomes a valley.

14. The electronic device according to claim 13, wherein the pleated user interface comprises a sheet of material having variable thickness, wherein the sheet is thinner at or near each of the ridges of the plurality of ridges and/or thinner at or near each of the valleys of the plurality of valleys.

15. The electronic device according to claim 13, wherein the actuator is configured to actuate a distance that is at least twice the distance between a ridge of the plurality of ridges and a valley of the plurality of valleys.

16. The electronic device according to claim 13, further comprising a plurality of LEDs, wherein at least a subset of the plurality of LEDs is coupled with the first ridge.

17. The electronic device according to claim 13, further comprising:
a strut used to couple the actuator with the first ridge of the plurality of ridges.

18. The electronic device according to claim 13, wherein the actuator is a piezoelectric linear actuator.

19. The electronic device according to claim 13, further comprising a first sensor that includes a bend sensor and/or an accelerometer, wherein the first sensor is coupled with the controller and is disposed on the first ridge.

20. An electronic device comprising:
a pleated user interface having a plurality of ridges and a plurality of valleys;
a first ridge of the plurality of ridges;
a stepper motor;
a wheel coupled with the stepper motor;
a strut coupled with the first ridge;
a display; and
a controller coupled with the display and the stepper motor, the controller being configured to:
provide a first page of a plurality of pages to the display; and
send a signal to the stepper motor to retract the first ridge.

* * * * *